United States Patent
Wehinger

[11] Patent Number: 5,827,957
[45] Date of Patent: Oct. 27, 1998

[54] METHOD AND APPARATUS FOR EVALUATING VEHICLE TIRE CONDITION BY COMPARING TIRE OPERATING PARAMETERS WITH PRESENT LIMITS OVERTIME

[75] Inventor: Horst Wehinger, Ebersbach, Germany

[73] Assignee: Mercedes-Benz AG, Germany

[21] Appl. No.: 822,014

[22] Filed: Mar. 24, 1997

[30] Foreign Application Priority Data

Mar. 22, 1996 [DE] Germany .................. 196 11 364.4

[51] Int. Cl.⁶ .................................................. G01M 17/02
[52] U.S. Cl. ........................ 73/146.3; 73/146; 701/29
[58] Field of Search ................. 73/146–146.8; 701/29

[56] References Cited

U.S. PATENT DOCUMENTS

| | | |
|---|---|---|
| 4,938,056 | 7/1990 | DeRudder et al. . |
| 5,109,213 | 4/1992 | Williams .................. 340/447 |
| 5,562,787 | 10/1996 | Koch et al. ................ 701/29 X |
| 5,663,496 | 9/1997 | Handfield et al. ........... 73/146.5 |

FOREIGN PATENT DOCUMENTS

| | | |
|---|---|---|
| 3029563 C3 | 2/1982 | Germany . |
| 32 36 520 A1 | 4/1984 | Germany . |
| 3236520 A1 | 6/1984 | Germany . |
| 2 049 248 | 4/1980 | United Kingdom . |
| 2 226 434 | 6/1990 | United Kingdom . |

*Primary Examiner*—Joseph L. Felber
*Attorney, Agent, or Firm*—Evenson, McKeown, Edwards & Lenahan P.L.L.C.

[57] ABSTRACT

The invention provides a method and an apparatus for monitoring vehicle tires, in which a desired range for the operating condition of a tire, (represented by at least one tire operating condition variable) is predetermined. Instantaneous values of the at least one tire operating condition variable are recorded continuously and compared with the desired range in order to establish whether the instantaneous tire operating condition lies within or outside the desired range specified. The frequency with which, and/or the proportion of the overall operation during which the operating phases in which the instantaneous tire operating condition lies outside the desired range is determined throughout the entire operation of the tire.

5 Claims, 1 Drawing Sheet

METHOD AND APPARATUS FOR EVALUATING VEHICLE TIRE CONDITION BY COMPARING TIRE OPERATING PARAMETERS WITH PRESENT LIMITS OVERTIME

This application claims the priority of German priority document 196 11 364.4, the disclosure of which is expressly incorporated by reference herein.

BACKGROUND AND SUMMARY OF THE INVENTION

The invention relates to a method and apparatus for monitoring vehicle tires, in which a desired range for the operating condition of a tire (represented by at least one condition variable) is specified and, by continuous recording of the instantaneous values of the at least one condition variable, it is established whether the instantaneous tire operating condition lies within the desired range specified. Methods and apparatus are known, which serve, above all, to warn the driver of excessively low tire pressure during current vehicle operation. In this case, tire pressure is used as the tire operating condition variable, and the associated desired range is a reliable tire pressure interval.

German patent document DE-OS 32 36 520 A1 describes a device for indicating the condition of vehicle tires, in particular the tire pressure and the profile depth. To do so, the device compares a vehicle speed reference value gained from the wheel speeds with the actual vehicle ground speed, measured by an appropriate sensor. A sudden drop in pressure in a tire at a given vehicle speed results in a correspondingly rapid change in the wheel speed, and thus in the vehicle speed reference value, which can be recognized by the device. In order to monitor long-term changes in tire condition due to tire wear, a central electronic control unit has a memory in which continuously measured wheel speeds can be stored. By comparing the continuously determined wheel speeds with the wheel speeds measured at the beginning (after having new tires fitted), the tire wear and thus the profile depth of the tires can be monitored over prolonged periods.

A method of determining tire pressure in vehicle wheels is disclosed in German patent document DE 30 29 563 C3, in which excessively low tire pressure can be recognized, taking into account the ambient temperature, the load condition of the vehicle, and the atmospheric air pressure by means of a specific sensor system and evaluation circuit.

The journal article "Reinfendruck im Blickfeld" [Tire pressure at a glance], Automobil-Elektronik, September 1990, page 30 discloses monitoring systems for vehicle tires in which a central control unit links the data from a tire pressure sensor system with further sensor signals which provide information on the outside temperature, the brake temperature, the vehicle speed and the vehicle load condition. This arrangement recognizes when the pressure in a tire lies too far below a specified desired pressure, and provides the driver with an appropriate warning via a visual display.

In the article "Elektronisches Reifendruck-Kontroll-System" [Electronic tire pressure control system], VDI Reports No. 819, 1990, p.207–216, an apparatus for the continuous recording of tire air pressure, tire air temperature, travelling speed and load is disclosed. If specified threshold values are exceeded, a warning is given in a display unit.

International patent document WO 95/22467 discloses an arrangement in which the tire pressure, tire temperature and the mileage can be continuously recorded and peak values of pressure and temperature can be determined. This information can be used to assess the tire condition.

As described, for example in the publication "European Tire and Rim Technical Organization—Standards Manual—1995", in particular pages 6 to 10, it is known that the condition of a vehicle tire should meet certain specifications to achieve reliable tire operation over a period of use which is as long as possible. In addition to specific geometric tolerances (with regard to tire width, diameter and camber angle, for example) this admonition applies, above all, to maintaining particular tire pressures as well as load-bearing and speed limits. For instance, the recommended load-bearing capacity decreases with dropping tire pressure, and (in the range of very high speeds) with an increasing vehicle speed.

One object of the invention is to provide a method and an apparatus of the type mentioned above which achieves high tire operating reliability with the least possible expenditure. Another object of the invention is to provide a method and apparatus which can assess whether a worn tire can be retreaded, as well as the cause of any tire damage, and whether it can be repaired.

According to the invention, the frequency and/or the portion of time during which the instantaneous tire operating condition lies outside a specified desired range is determined and recorded throughout the entire operation of the tire. This range is chosen to ensure that the operating reliability and service life of the tire are not appreciably impaired, so long as the operating condition of the tire lies within the desired range. This arrangement thus can help to find the cause of a tire failure, eliminating at least in part the need for complex investigations by authorized inspectors in this regard. Moreover, this procedure allows a comparatively reliable assessment to be made as to whether tire damage can be repaired and whether a worn tire can still be retreaded, based on its previous history. The repairability of a tire and its suitability for retreading can, of course, be estimated as all the more favorable, the shorter the frequency or smaller the proportion of overall operation time (i.e., the proportion of the overall service life or mileage of the tire) which is taken up by those operating phases in which the tire operating condition lies outside the desired range specified.

According to one embodiment of the invention, one or more of the variables, tire temperature, ambient temperature, vehicle speed, vehicle load and tire mileage, are used in addition to the tire pressure as condition variables for characterizing the tire condition.

According to another embodiment, the values of the tire operating condition variables during operating phases in which the tire operating condition lies outside the desired range specified are stored and later retrieved for use in assessing tire conditions, thus providing particularly precise knowledge of the previous tire history.

Other objects, advantages and novel features of the present invention will become apparent from the following detailed description of the invention when considered in conjunction with the accompanying drawings.

DETAILED DESCRIPTION OF THE DRAWINGS

Figure 1:
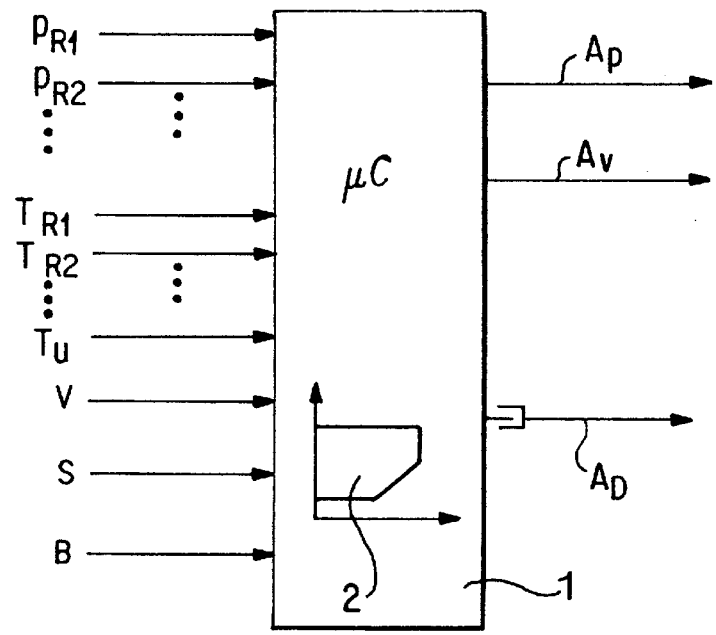
FIG. 1 shows a block diagram of a central microprocessor for monitoring vehicle tires.

The apparatus illustrated in FIG. 1 includes a central microprocessor for the long-term monitoring of the tires of a vehicle. With this processor it is possible to assess the operating reliability of the tires, and to determine whether any tire damage is likely to be repairable, as well as whether a worn tire is still in a sufficiently good condition to be able to be retreaded. The parameter which fundamentally determines the load (and thus the operating reliability and service life) of a tire is the tire deflection during operation. By means of the monitoring method according to the present invention, tire loading is recorded comparatively precisely by taking into account not only tire pressure, but also tire temperature in comparison with the ambient temperature, the vehicle load and the vehicle speed.

The microprocessor (1) shown in FIG. 1 serves as a central processor for monitoring the pressures ($P_{R1}$, $P_{R2}$, ...) and temperatures ($T_{R1}$, $T_{R2}$, ...) of the individual vehicle tires, as well as the ambient temperature ($T_U$), vehicle speed (v), mileage (s) previously travelled with the relevant tires, and the information on the vehicle load (B). These input variables can be recorded by suitable sensors of conventional design, which do not require any further explanation here. The measured values are transmitted to the microprocessor (1) either by wire or in a wireless manner (for example by radio link). As an alternative to recording by means of a kilometer counter, the mileage can also be determined by calculation from the speed information (v) supplied. The microprocessor (1) is of course set up to monitor the vehicle tires, taking into consideration the respective vehicle and tire types.

Stored in the microprocessor (1) is a multidimensional characteristic field (2) which defines a desired range for the physical variables which are relevant to the tire operating condition. The instantaneous value of each relevant parameter should fall within this range during operation of the tires in order to allow gentle tire operation with a long tire service life. These tire operating condition variables, i.e., the tire pressure ($P_{R1}$, $P_{R2}$, ...), the tire temperature ($T_{R1}$, $T_{R2}$, ...), the ambient temperature ($T_U$), the vehicle speed (v), the vehicle load (B) and the mileage (s), are fed to the microprocessor (1). Additionally, if required, further geometrical tire variables may be taken into account, such as for example the tire width, tire diameter, and camber angle. Depending on the application, the values of these geometrical tire variables may be entered by hand or measured continuously (i.e., periodically at predeterminable intervals) by means of appropriate conventional sensors.

Figure 2:
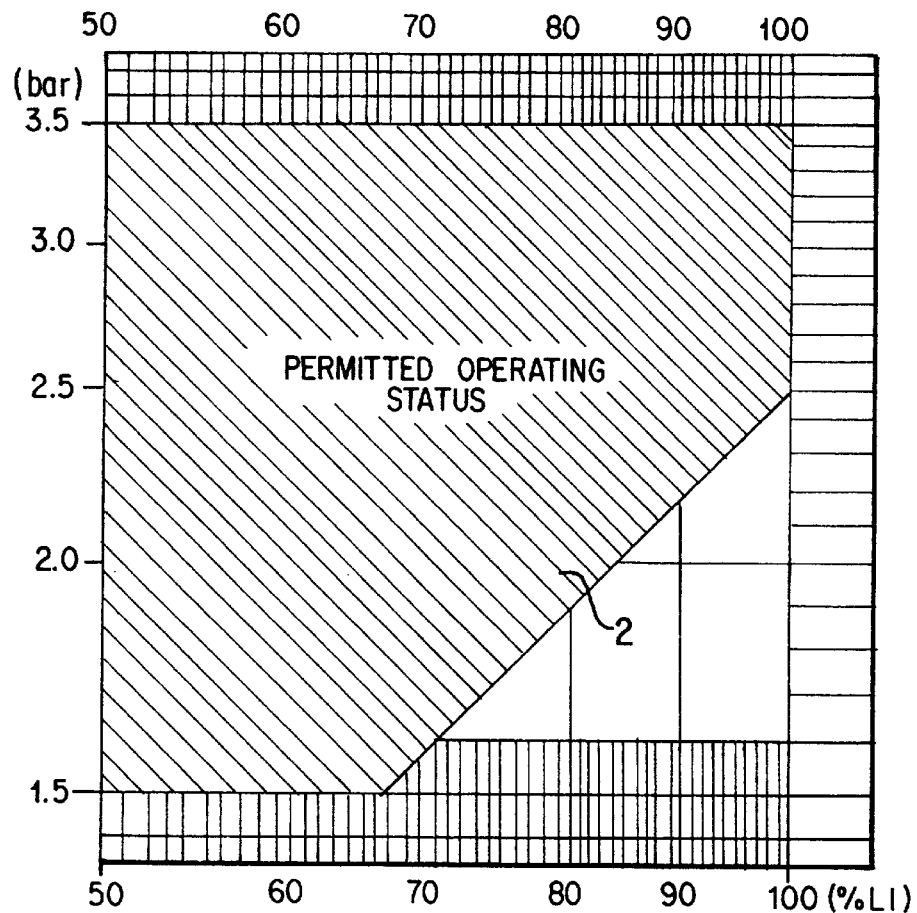
FIG. 2 shows a diagram to illustrate a desired range for the tire operating condition stored in the microprocessor of FIG. 1.

FIG. 2 illustrates in a simplified manner the desired range (2) stored in the microprocessor (1) in a two-dimensional projection. The relevant variable, in this case tire pressure, is plotted on the y-axis and a loading factor representing the other relevant tire operating condition variables for the purpose of simpler illustration, is plotted on the x-axis. The 100% value (LI) of this loading factor corresponds to the load-bearing capacity standardized at a tire pressure of 2.5 bar for the relevant tire. Tables of this standard load-bearing capacity as a function of the tire pressure for different types of tires (i.e., for tires with a different so-called loadability index) can be found in the abovementioned Standards Manual of the European Tire and Rim Technical Organization. The desired range (2), illustrated in FIG. 2, is represented there as a black area of permissible tire operating conditions. It can be seen that, as tire pressure decreases below 2.5 bar, the desired range (2) is limited to decreasing loading factor values. The lower right portion of the graph indicates an area of departure from the desired range (2) at a lower tire pressure and a relatively high loading factor, which constitutes an unfavorable operating condition.

It should be noted that the different relevant tire operating condition variables used to define the desired range (2) are at least partially interdependent. (For example, the tire pressure changes as a function of the vehicle speed, the tire temperature, the ambient temperature and the vehicle load.) Thus, the desired range (2) represents, upon closer inspection, a specific partial area of the total area covered by the tire operating condition variables. When the instantaneous operating condition of a tire falls outside of this desired-range partial area (2), an unfavorable operating state exists, meaning that excessive loading of the tire impairs its service life to an excessive extent.

Such unfavorable operating conditions should be avoided if possible, since vehicle tires have a "memory" for the effects of any resultant damage. That is, once a tire has been damaged, such damage does not disappear completely after the desired range (2) has subsequently been reached again. Rather, all such damage contributes additively to aging of the tire owing to gradual material fatigue due to flexing. The latter is significantly determined by the tire deformation, and thus the tire deflection.

The apparatus of FIG. 1 allows the tire condition (which is dependent on its operating history, as noted above) to be assessed reliably with regard to both the operating reliability of the tire and (in the event of any tire damage) whether it can be repaired. In the case of a worn tire, such tire monitoring can also establish whether effective retreading of the tire is still possible. For this purpose, the microprocessor (1) continuously receives instantaneous values indicative of the condition variables used for defining the desired range (2) of tire operation, and determines, based on this information, whether the instantaneous tire operating condition lies within the specified and stored desired range (2). Whenever it recognizes that one or more instantaneous values of the condition variables have departed from their desired range, it emits an appropriate warning. For instance, via a first output channel ($A_p$) information is given as to whether the tire pressure lies within a desired interval, and emits a tire pressure warning when it does not. Analogously, the microprocessor (1) emits a warning, if appropriate, via a second output channel ($A_v$), indicating that the maximum vehicle speed permitted in view of the instantaneous tire operating condition, has been exceeded.

Simultaneously with these warnings, the microprocessor (1) registers the departure from the desired range (2) of tire operation, and stores this information in a corresponding memory. In a preferred embodiment, the microprocessor (1) records and stores not only the fact of such departure from the desired range, but also its duration. Similarly, the route travelled or tire mileage during this period can be determined and registered.

In a further advantageous embodiment, the microprocessor (1) also records and stores in a memory the instantaneous values of the tire operating condition variables during the operating times when the tire operating condition lies outside the desired range (2) specified. In this manner, operating periods during which, for example, the driver operates the vehicle outside the desired range (2) of tire operation despite a prior warning, and which therefore have an adverse effect on the tires, are reliably documented.

The data stored in the microprocessor (1) can then be read out at any desired time via a data retrieval output ($A_D$) in order to assess the current tire condition based on its previous history. In particular, the frequency and/or the proportion of the overall operating time during which the tire operating condition was outside the desired range (2), can be retrieved. Moreover, if appropriate, the proportion of the total tire mileage during which the tire operating condition was outside the desired range (2) can also be retrieved. This information on the frequency and/or the duration and the mileage of tire operating periods lying outside the desired range (2) permits highly reliable conclusions to be drawn concerning: i) whether the tire can continue to be operated with sufficient operating reliability, ii) whether any tire damage that has occurred can be repaired, and iii) whether a worn tire can be safely retreaded.

Heretofore, highly unreliable assessments of this type have often been made by authorized inspectors, solely from analyzing the present observable tire condition. A more precise assessment or analysis of the respective tire condition is made possible by recording and storing the individual instantaneous values of the condition variables in the microprocessor (1) during tire operating periods lying outside the desired range (2). This data can be retrieved at a desired time in order to obtain more precise information concerning how many and which instantaneous values of the tire operating condition variables were outside their desired range (2), and to what extent. This then permits very precise conclusions concerning the current tire condition. If required, the data stored can be protected from manipulation by limiting access to authorized persons, for example by means of a password.

With the apparatus shown and the method described, individual monitoring of the tires of a vehicle is possible with regard to accumulated influences on the tire condition for the reliable, current assessment thereof.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method of evaluating a vehicle tire condition comprising the steps of:

providing a predetermined desired range for an operating condition of said tire, said range comprising at least one tire operating condition parameter;

continuously detecting instantaneous values of said at least one tire operating condition parameter;

comparing detected instantaneous values with said predetermined desired range to determine whether an instantaneous operating condition of said tire falls within said desired range; and determining at least one of a frequency with which, and a proportion of overall tire operation during which, said instantaneous operating condition of said tire is outside said desired range.

2. Method according to claim 1 wherein said at least one tire operating condition parameter comprises tire pressure and at least one of tire temperature, ambient temperature, vehicle speed, vehicle load and tire mileage.

3. Apparatus for monitoring vehicle tires comprising:

a memory containing data defining a predetermined desired range for an operating condition of said tire, said range comprising at least one tire operating condition parameter; and a digital computer programmed to continuously record instantaneous values of said at least one tire operating condition parameter;

compare recorded instantaneous values with said predetermined desired range to determine whether an instantaneous operating condition of said tire falls within said desired range; and determine at least one of a frequency with which, and a proportion of overall tire operation during which, said instantaneous operating condition of said tire is outside said desired range.

4. Apparatus according to claim 3 wherein said at least one tire operating condition parameter comprises tire pressure and at least one of tire temperature, ambient temperature, vehicle speed, vehicle load and tire mileage; and the desired range specified is stored in the digital computer as a partial area of the total area covered by said tire operating condition parameters.

5. Apparatus according to claim 3 wherein the digital computer records as tire operating condition variables instantaneous values of tire pressure, tire temperature, ambient temperature, vehicle speed, vehicle load and tire mileage, in a retrievable manner during those operating phases in which the instantaneous tire operating condition lies outside the desired range.

* * * * *